US009769136B2

United States Patent
Shigapov

(10) Patent No.: US 9,769,136 B2
(45) Date of Patent: *Sep. 19, 2017

(54) SYSTEM AND METHOD FOR PROVIDING PROACTIVE VPN ESTABLISHMENT

(71) Applicant: F5 Networks, Inc., Seattle, WA (US)

(72) Inventor: Andrey Shigapov, Fremont, CA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,352

(22) Filed: Oct. 31, 2014

(65) Prior Publication Data

US 2015/0215303 A1   Jul. 30, 2015

Related U.S. Application Data

(63) Continuation of application No. 12/826,515, filed on Jun. 29, 2010, now Pat. No. 8,881,261.

(51) Int. Cl.
*H04L 29/06* (2006.01)
*H04W 12/02* (2009.01)
*H04W 36/00* (2009.01)

(52) U.S. Cl.
CPC .......... *H04L 63/08* (2013.01); *H04L 63/0272* (2013.01); *H04W 12/02* (2013.01); *H04W 36/0038* (2013.01)

(58) Field of Classification Search
CPC ....... H04L 63/20; H04L 63/205; H04L 63/08; H04L 63/0876
See application file for complete search history.

(56) References Cited

U.S. PATENT DOCUMENTS

| | | | |
|---|---|---|---|
| 2005/0163079 A1* | 7/2005 | Taniuchi et al. | 370/331 |
| 2005/0171872 A1* | 8/2005 | Burch | G06F 17/30575 705/29 |
| 2007/0113275 A1* | 5/2007 | Khanna et al. | 726/15 |
| 2009/0037998 A1* | 2/2009 | Adhya et al. | 726/11 |
| 2010/0071043 A1* | 3/2010 | Babula | H04L 63/0272 726/7 |

\* cited by examiner

*Primary Examiner* — Edward Zee
(74) *Attorney, Agent, or Firm* — LeClairRyan, a Professional Corporation

(57) ABSTRACT

A system and method which includes monitoring an existing first connection to a secured network domain. A first network configuration is employed to access the secured network domain via the first connection. An available second connection to the network domain is detected, whereby the system and method automatically switch to the second connection to access the secured network domain upon detecting a termination with the first connection. Access to the secured network domain, via the second connection, is established by employing a second network configuration. In an aspect, the first connection is by cable and the first network configuration is associated with direct access to the secured network domain. In an aspect, the second connection is a wired or wireless signal and the second network configuration is associated with a Virtual Private Network (VPN) connection.

16 Claims, 3 Drawing Sheets

SYSTEM AND METHOD FOR PROVIDING PROACTIVE VPN ESTABLISHMENT

This application is a continuation of prior U.S. patent application Ser. No. 12/826,515, filed Jun. 29, 2010, which is herein incorporated by reference.

TECHNOLOGICAL FIELD

This technology generally relates to a system and method for providing VPN establishment to a secure network domain.

BACKGROUND

Virtual Private Networks (VPN) have become extremely popular and useful in today's global economy. Companies as well as governmental entities which have offices in different regions allow their employees to directly access their own private secured network domains using a hard cable, such as an Ethernet cable. It is also very common for a company to offer wireless connectivity (i.e. WiFi) to those who are able to access it, whereby a person with a laptop can access a wide area network, like the internet. Many of these companies also allow their employees to access the company's secured network domain using a VPN connection, whereby the VPN connection can be established using the wireless signal.

It often occurs that an employee who is logged into the secured network domain must switch between direct access and the VPN. In particular, the employee may have to undock her laptop from her office (terminating the direct access connection) and take it to a conference room where only a wireless connectivity signal is present. If the user wants to access the network domain while using the wireless signal, she will have to initiate the VPN process and again log into the network domain. This can be cumbersome and time consuming.

What is needed is a system and method which automatically switches between direct access and VPN access configurations while maintaining access to the network domain.

SUMMARY

In an aspect, a method comprises monitoring an existing first connection over a local area network to a secured network domain, wherein a first network configuration is employed to access the secure network domain via the first connection. The method comprises detecting an available second connection to the network domain. The method comprises automatically switching to the second connection to access the secured network domain upon detecting a termination with the first connection. Access to the secured network domain via the second connection is established by employing a second network configuration.

In an aspect, a machine readable medium having stored thereon instructions, which comprises machine executable code which when executed by at least one machine, causes the machine to monitor an existing first connection over a local area network to a secured network domain. A first network configuration is employed to access the secure network domain via the first connection. Additionally, the machine detects an available second connection to the secured network domain. Further, the machine automatically switches to the second connection to access the secured network domain upon it detecting a termination with the first connection. Thereafter, access to the secured network domain via the second connection is established by employing a second network configuration.

In another aspect, a client device comprises a network interface that is configured to monitor changes in network connectivity to a secured network domain. The client device includes a controller which is coupled to the network interface, wherein the controller employs a first network configuration to access the secure network domain when the network interface monitors that the first connection is available. The controller is configured to automatically access the secure network domain using an available second connection upon the network interface detecting a termination with the first connection.

In one or more of the above aspects, the first connection is by cable and the first network configuration is associated with direct access to the secured network domain. In one or more of the above aspects, the second connection is a wireless signal or cable and the second network configuration is associated with a Virtual Private Network (VPN) connection. In one or more of the above aspects, the establishing of access to the secured network further comprises initiating user login processes associated with the second network configuration. In one or more of the above aspects, the system, machine code and/or method detects the previously terminated first connection to be again be available and automatically employs the first network configuration to establish access to the secure network domain via the available first connection. In one or more of the above aspects, the system, machine code and/or method terminates the second connection to the secured network domain after establishing access to the secured network domain using the first connection. In one or more of the above aspects, access to the secured network domain is uninterrupted when the switching between the first and the second connections.

Figure 1:
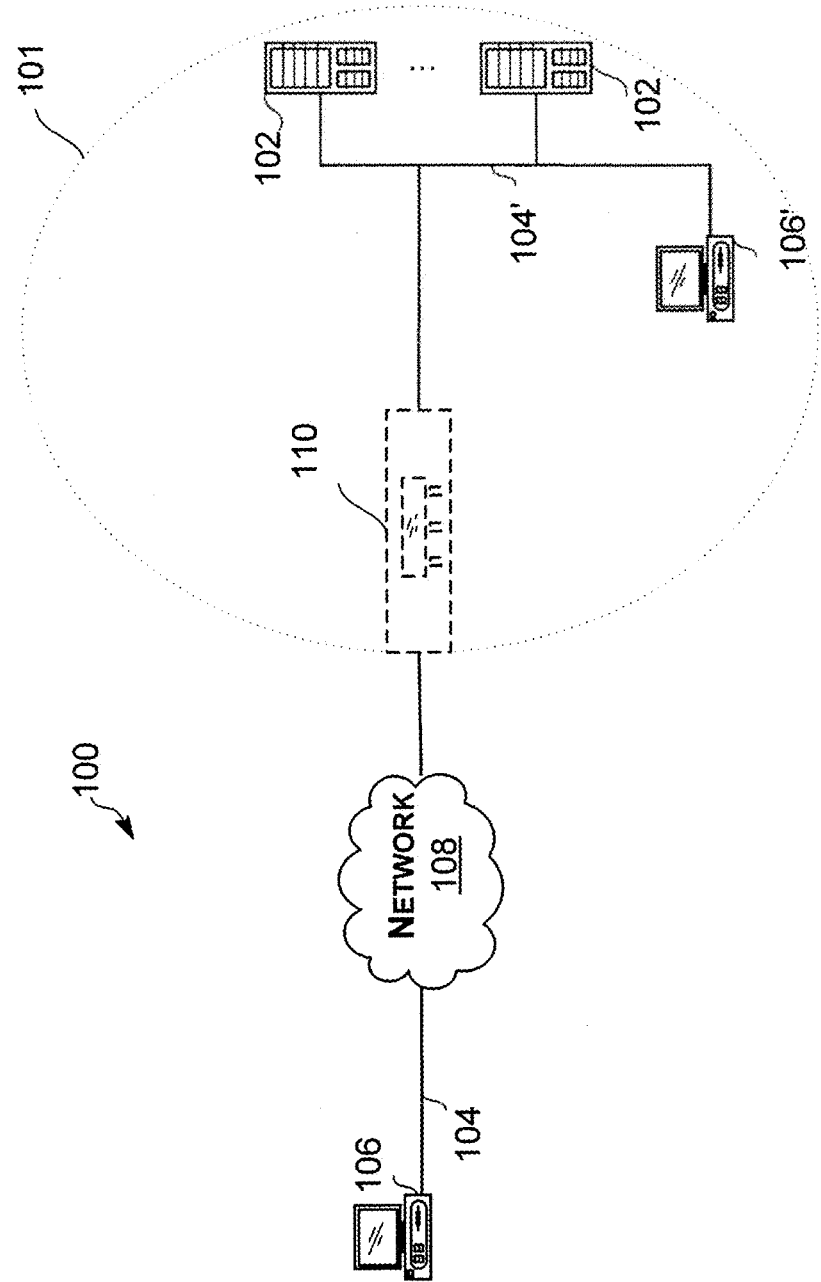
FIG. 1 illustrates a diagram of an example system environment that allows proactive VPN establishment in accordance with an aspect of the present disclosure.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

FIG. 1 illustrates a diagram of an example system environment that allows proactive VPN establishment in accordance with an aspect of the present disclosure. In particular to FIG. 1, an example system environment 100 includes one or more application servers 102, a wide area network 108, one or more client devices 106 remotely connected to the application servers 102 via the wide area network 108, one or more client devices 106' directly connected to the application servers 102 via a direct local area network (LAN) 104', and a network traffic management device 110. It is contemplated that the environment 100 could include other numbers and types of devices in other arrangements.

The network traffic management device 110 is coupled to the application servers 102 and the secured network domain operated by the servers 102 via the direct LAN 104'. The remote client devices 106 are remotely connected to the web server 102 using an established VPN tunnel over the wide area network 108. Generally, requests sent over the network 108 from client devices 106 towards servers 102 are received and handled via the network traffic management device 110.

Client devices 106 and 106' comprise computing devices capable of connecting to other computing devices, such as network traffic management device 110 and servers 102. Such connections are performed over wired and/or wireless networks, such as network 108, to send and receive data, such as for Web-based requests, receiving responses to requests and/or performing other tasks, in accordance with the processes described below in connection with FIG. 3. Non-limiting and non-exhausting examples of such devices include personal computers (e.g., desktops, laptops), mobile and/or smart phones and the like. In an example, client devices 106 run Web browsers that may provide an interface for operators, such as human users, to interact with for making requests for resources to different web server-based applications or Web pages via the network 108 and/or LAN 104/LAN 104', although other server resources may be requested by clients. One or more Web-based applications may run on the server 102 that provide the requested data back to one or more exterior network devices, such as client devices 106.

Network 108 comprises a publicly accessible network, such as the Internet, which includes client devices 106. However, it is contemplated that the network 108 may comprise other types of private and public networks that include other devices. Communications, such as requests from clients 106 and responses from servers 102, take place over the network 108 according to standard network protocols, such as the HTTP and TCP/IP protocols in this example. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 includes any communication method by which data may travel between client devices 106, servers 102 and network traffic management device 110, and the like.

LAN 104' comprises a private local area network that includes the network traffic management device 110 coupled to the one or more servers 102, although the LAN 104 may comprise other types of private and public networks with other devices. Networks, including local area networks, besides being understood by those skilled in the relevant arts, have already been generally described above in connection with network 108 and thus will not be described further. Typically, as shown in FIG. 1, client devices 106' access the secured network domain 101 (also referred to herein as a secured enterprise), operated by the servers 102, by a closed, direct wired or wireless connection via the LAN 104'. In an example, the client device 106' may be physically connected to a docking station located in a company building, in which the docking station is directly connected via a physical wire (e.g. Ethernet cable) to the company's LAN 104'. In an aspect, the client device 106' may be wirelessly connected to the network domain 101 using the direct LAN. In another aspect, the client device (referred to as 106 in FIG. 1) may access the company's network domain 101 using a VPN connection over a wide area network 108.

The server 102 comprises one or more server computing machines capable of operating one or more Web-based applications that may be accessed by network devices in the network 108. Such network devices include client devices 106, via the network traffic management device 110, and may provide other data representing requested resources, such as particular Web page(s), image(s) of physical objects, and any other objects, responsive to the requests. Additionally, one or more servers 102 operate software which provide a secured network domain or enterprise 101 which is accessed authenticated client devices which are logged into the network domain 101. It should be noted that the server 102 may perform other tasks and provide other types of resources. It should be noted that while only two servers 102 are shown in the environment 100 depicted in FIG. 1, other numbers and types of servers may be coupled to the network traffic management device 110. It is also contemplated that one or more of the servers 102 may be a cluster of servers managed by the network traffic management device 110.

Requests from the requesting client devices 106' may be sent as one or more streams of data packets over the direct LAN 104' to the servers 102. As per the TCP/IP protocols, requests from the requesting client devices 106 may be sent as one or more streams of data packets over the wide area network 108 to the network traffic management device 110 and/or the servers 102. Such protocols can establish connections, send and receive data for existing connections, and the like. It is to be understood that the one or more Web application servers 102 may be hardware and/or software, and/or may represent a system with multiple servers that may include internal or external networks. In this example, the Web application servers 102 may be any version of Microsoft® IIS servers or Apache® servers, although other types of servers may be used. Further, additional servers may be coupled to the network 108 and many different types of applications may be available on servers coupled to the network 108.

Each of the servers 102 and client devices 106 may include one or more central processing units (CPUs), one or more computer readable media (i.e., memory), and interface systems that are coupled together by internal buses or other links as are generally known to those of ordinary skill in the art.

As shown in the example environment 100 depicted in FIG. 1, the network traffic management device 110 is interposed between client devices 106 in network 108 and servers 102 in LAN 104'. Again, the environment 100 could be arranged in other manners with other numbers and types of devices. Also, the network traffic management device 110 is coupled to network 108 by one or more network communication links and intermediate network devices (e.g.

routers, switches, gateways, hubs and the like) (not shown). It should be understood that the devices and the particular configuration shown in FIG. 1 are provided for exemplary purposes only and thus are not limiting.

Generally, the network traffic management device 110 manages network communications, which may include one or more client requests and server responses, from/to the network 108 between the client devices 106 and one or more of the servers 102 in the LAN 104'. These requests may be destined for one or more servers 102, and may take the form of one or more TCP/IP data packets originating from the network 108. The requests pass through one or more intermediate network devices and/or intermediate networks, until they ultimately reach the network traffic management device 110. In any case, the network traffic management device 110 may manage the network communications by performing several network traffic related functions involving the communications. Such functions include load balancing, access control, and validating HTTP requests using JavaScript code that are sent back to requesting client devices 106 in accordance with the processes described further below in connection with FIG. 3. The network traffic management device 110 also handles communications between the client devices 106 and the secured network domain 101, whereby the client device 106 is remotely connected to the network domain 101 using a VPN tunneling connection over the wide area network 108. For example, the client device 106 may access the secured network domain via LAN 104' using a VPN connection over a wired or wireless signal (e.g. WiFi, WiMax) provided in or near the company building (e.g. conference room). It is contemplated in another aspect, that client device 106 may access the secured network domain using a VPN connection over a wide area network 108 via a wired or wireless signal (e.g. WiFi, WiMax) provided in or near the company building.

Figure 2:
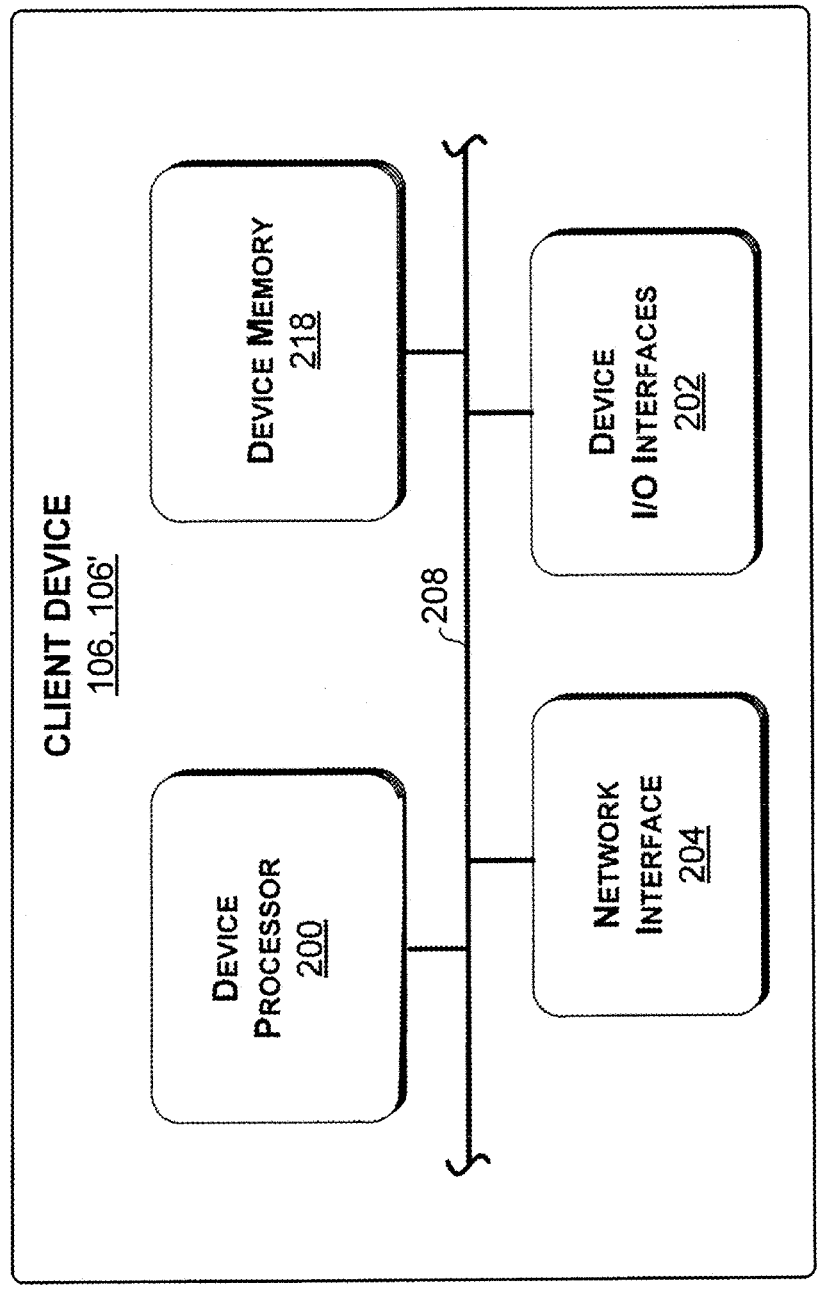
FIG. 2 is a block diagram of a client device shown in FIG. 1.

Referring now to FIG. 2, an example client device 106, 106' includes a device processor 200, device I/O interfaces 202, network interface 204 and device memory 218, which are coupled together by bus 208. It should be noted that the device 106, 106' could include other types and numbers of components.

Device processor 200 comprises one or more microprocessors configured to execute computer/machine readable and executable instructions stored in device memory 218. In addition, the instructions implement the security module 210 to perform one or more portions of the processes illustrated in FIG. 3. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor or control is programmed or configured according to the teachings as described and illustrated herein with respect to FIG. 3.

Device I/O interfaces 202 comprise one or more user input and output device interface mechanisms. The interface may include a computer keyboard, mouse, display device, and the corresponding physical ports and underlying supporting hardware and software to enable the client device 106, 106' to communicate with the outside environment. Such communication may include accepting user data input and to provide user output, although other types and numbers of user input and output devices may be used. Additionally or alternatively, as will be described in connection with network interface 204 below, the client device 106, 106' may communicate with the outside environment for certain types of operations (e.g., configuration) via a network management port. In particular to the present disclosure, the device interface 202, which may be handled by the network interface 204, which allows communications with one or more servers 102 via the direct LAN 104' via wired or wireless connections, and/or over the wide area network 108 via LAN 104, wherein the servers 102 provide access to a secured network domain or enterprise.

Network interface 204 comprises one or more mechanisms that enable client device 106, 106' to engage in TCP/IP communications over the LAN 104 to the network 108 as well as the direct LAN 106' to the secured network 101. However, it is contemplated that the network interface 204 may be constructed for use with other communication protocols and types of networks, such as protocols and access configurations associated with Virtual Private Networks (VPN). Network interface 204 is sometimes referred to as a transceiver, transceiving device, or network interface card (NIC), which transmits and receives network data packets to one or more networks, such as LAN 104 and network 108 as well as LAN 104'. In an example where the client device 106, 106' includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the client device 106, 106' with other network devices, such as servers 102 via the direct LAN 104'. Moreover, the interface 204 may include certain physical ports dedicated to receiving and/or transmitting certain types of network data, such as device management related data for configuring the client device 106, 106'.

Bus 208 may comprise one or more internal device component communication buses, links, bridges and supporting components, such as bus controllers and/or arbiters. The bus enable the various components of the client device 106, 106', such as the processor 200, device I/O interfaces 202, network interface 204, and device memory 218, to communicate with one another. However, it is contemplated that the bus may enable one or more components of the client device 106, 106' to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the client device 106, 106'.

Device memory 218 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media contains computer readable/machine-executable instructions, data structures, program modules, or other data, which may be obtained and/or executed by one or more processors, such as device processor 200. Such instructions allow the processor to perform actions, including implementing an operating system for controlling the general operation of the client device 106, 106'

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information. Such desired information includes data and/or computer/machine-executable instructions and which can be accessed by a computing or specially programmed device, such as the client device 106, 106'.

Although an example of the server 102, network traffic device 110, and client devices 106, 106' are described and illustrated herein in connection with FIGS. 1 and 2, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Furthermore, each of the devices of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like. The devices may be programmed according to the teachings as described and illustrated herein, as will be appreciated by those skilled in the computer, software, and networking arts.

In addition, two or more computing systems or devices may be substituted for any one of the devices in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Specific network operations and configurations are employed by the client device 106, 106' to initiate and establish access to the secured network. In particular, upon the user plugging in an Ethernet cable into a client device 106' (e.g. laptop), the client device 106' will detect that the Ethernet port is active and determine whether a direct connection to the secured network domain via LAN 104' is available. If so, the controller 200 will perform operations specific to direct access configurations to initiate and establish direct hardwire access to the secured network domain over the LAN 104'. Similarly, when the network interface 204 detects that the Ethernet port is no longer active (i.e. Ethernet cable is removed from laptop) and/or when a wireless signal is available to access the secured network domain via the LAN 104' and/or a wide area network 108, the controller 200 performs specific operations associated with VPN access configurations to initiate and establish access to the secured network domain using the VPN configuration.

In an aspect, the network interface 204 can detect and monitor whether direct access to the secured network domain 101 is available using a hardwire and/or a wireless signal. If both connection types are available, the controller 200 can perform operations for both direct and VPN access configurations to ensure that access to the secured network domain 101 is able to be maintained even if one of the connections later terminates.

For example, the controller 200 and the client device 106 will automatically switch from the direct hardwire connection configuration to the wireless VPN connection configuration to maintain the access to the secured network domain 101 when if direct hardwire connection is terminated (e.g. Ethernet cable removed from client device 106). The wireless connection may be a direct LAN 104' connection to the network 101, in which the client device is 106' in FIG. 1. However, the wireless connection may not be a direct LAN 104' connection, but instead only a connection to the wide area network 108 (client device is 106 in FIG. 1). In this case, additional or different VPN connection configurations and/or authentication procedures may be employed on the client device 106 to establish access to the network 101.

In contrast, the controller 200 will automatically switch from the VPN connection configuration back to direct hardwire connection configuration, while maintaining access to the secured network domain 101, if the direct access connection is again detected by the network interface 204 (e.g. the user plugging the Ethernet cable back into the client device 106').

In an aspect, the user's authentication information for the network domain 101 is locally stored on the client device 106', such that it can be easily retrieved and used to establish access to the network domain 101 when the controller 200 switches to another network configuration. In an aspect, the VPN access configuration may require two-factor authentication, whereby the user must input additional authentication information (e.g. SecureID™) to access the secured network domain. In this aspect, the controller 200 will perform the necessary operations to initiate the VPN access to the secure domain 101 except for information which the user must manually input to complete the login process.

Figure 3:
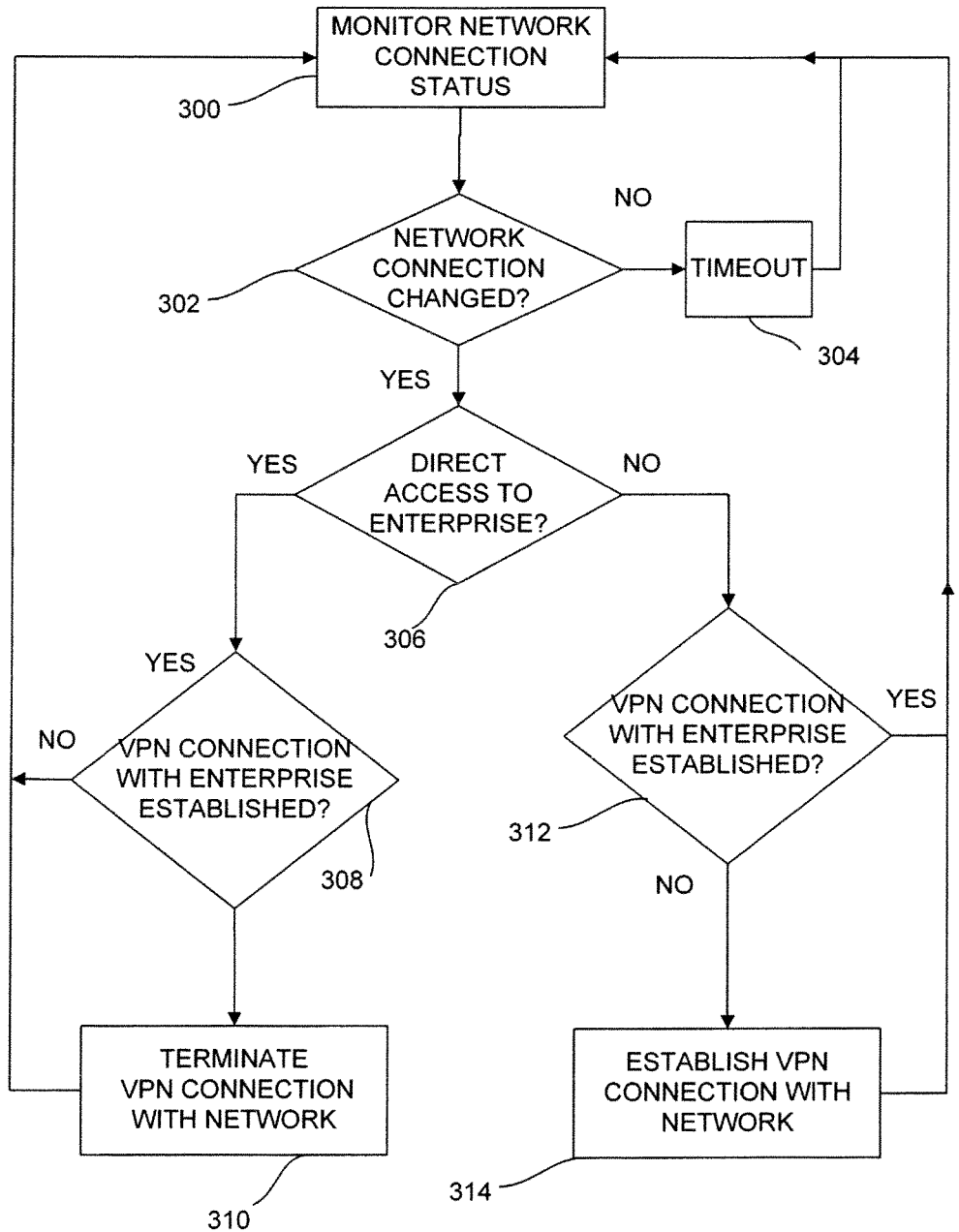
FIG. 3 is an example flow chart diagram depicting portions of processes for maintaining connectivity to a secure network domain when switching from a direct LAN connection to a connection without direct access to secure network domain in accordance with an aspect of the present disclosure.

FIG. 3 is an example flow chart diagram depicting portions of processes for maintaining connectivity to a secure network domain when switching from a direct hardwire connection to a connection without direct access to LAN 104' in accordance with an aspect of the present disclosure. As shown in FIG. 3, one or more network connections are monitored by the network interface 204 in which the user is already connected to the secured network domain 101 (block 300). As described above, the user may already be connected to the secured network domain 101 by a direct hardwire connection (e.g. Ethernet cable). Additionally or alternatively, the user may already be connected to the secured network domain 101 over a wireless signal using a VPN connection, whereby the wireless signal allows access to the network 101 over a dedicated LAN 104 and/or over the wide area network 108.

In the case that a direct hardwire connection and a VPN connection to the network 101 are both available to the device, the client device 106' will secure access to the network 101 using the direct hardwire connection, although this is not required. For instance, the client device 106 may be configured to preferably access the network 101 using a wireless connection. In block 302, the network interface 204 constantly or periodically monitors whether the established connection currently being used by the device 106 has changed (e.g. connection terminated, status of domain server response, server become available). If there is no change, the network interface 204 times out (block 304) and continues to monitor the existing used connection.

However, if the client device 106 detects a change in the currently used connection, the network interface 204 will determine whether another connection means is available to directly access the network domain 101 (block 306). In an aspect, the network interface 204 can perform this step in a variety of ways including, but not limited to, checking if the direct access configuration on the device 106 is being used, whether traffic is present between the device 106 and the network domain 101 using the other connection means and the like.

If it is determined that the device 106 has direct hardwire access to the network domain 101 via LAN 104' using another connection means, the client device 106 will establish connection to the network domain 101 using that other connection means. The client device 106 also determines whether it is currently running a VPN connection configuration over a wireless connection which is not being used to connect to the network domain 101 (block 308). If so, the VPN connection is terminated (block 310) and the process begins again at block 300. It is contemplated that the device 106 may alternatively continue to run the VPN configuration as a back up which the device 106 may automatically switch to if direct hardware access to the network domain later terminates.

Returning to block 306, if the network interface 204 determines that direct hardwire access is no available to the secured network 101, the client device 106 checks to see if it already has an established VPN connection with the network domain 101 (block 312). If the device 106 has an established VPN connection, the device 106 switches to the VPN connection to continue access to the network domain 101, whereby the process returns to block 300. However, if it determined that the device 106 does not already have a VPN connection with the network domain, the device 106 establishes a VPN connection to the network domain 101 by performing the VPN configuration process (block 314). Thereafter, the process returns to block 300.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for facilitating network connectivity across connection types implemented by a network traffic management system comprising one or more network traffic management devices, server devices, or client devices, the method comprising:
monitoring an existing first connection to a secured network domain, wherein a first network configuration is employed to access the secured network domain via the first connection;
detecting a termination of the first connection and subsequent to detecting the termination of the first connection:
retrieving locally stored authentication information for a user and automatically switching from the first connection to a second connection to allow access to the secured network domain, wherein the first connection is a wired connection and the second connection is a wireless connection or the first connection is a wireless connection and the second connection is a direct connection and one or more of the first or second network connection is a virtual private network (VPN) connection;
establishing access to the secured network domain via the second connection by employing a second network configuration; and
initiating one or more user login processes associated with the second network configuration using the retrieved locally stored authentication information.

2. The method of claim 1, wherein one of the first network configuration or the second network configuration is associated with wired access to the secured network domain and one of the first network configuration or the second network configuration is associated with wireless access to the secured network domain.

3. The method of claim 1, further comprising:
detecting the previously terminated first connection to again be available;
automatically employing the first network configuration to establish access to the secured network domain via the available first connection; and
terminating the second connection to the secured network domain after establishing access to the secured network domain using the first connection.

4. The method of claim 1, wherein access to the secured network domain is substantially uninterrupted upon switching between the first and the second connections.

5. A non-transitory machine readable medium having stored thereon instructions for facilitating network connectivity across connection types comprising executable code which when executed by one or more processors, causes the one or more processors to:
monitor an existing first connection to a secured network domain, wherein a first network configuration is employed to access the secured network domain via the first connection;
detect a termination of the first connection and subsequent to detecting the termination of the first connection:
retrieve locally stored authentication information for a user and automatically switching from the first connection to a second connection to allow access to the secured network domain, wherein the first connection is a wired connection and the second connection is a wireless connection or the first connection is a wireless connection and the second connection is a direct connection and one or more of the first or second network connection is a virtual private network (VPN) connection;
establish access to the secured network domain via the second connection by employing a second network configuration; and
initiate one or more user login processes associated with the second network configuration using the retrieved locally stored authentication information.

6. The non-transitory machine readable medium of claim 5, wherein one of the first network configuration or the second network configuration is associated with wired access to the secured network domain and one of the first network configuration or the second network configuration is associated with wireless access to the secured network domain.

7. The non-transitory machine readable medium of claim 5, wherein the executable code when executed by the one or more processors further causes the one or more processors to:
detect the previously terminated first connection to again be available;

automatically employ the first network configuration to establish access to the secured network domain via the available first connection; and terminate the second connection to the secured network domain after establishing access to the secured network domain using the first connection.

8. The non-transitory machine readable medium of claim 5, wherein access to the secured network domain is substantially uninterrupted upon switching between the first and the second connections.

9. A network device comprising memory comprising programmed instructions stored thereon and one or more processors configured to execute the stored programmed instructions to:
  monitor an existing first connection to a secured network domain, wherein a first network configuration is employed to access the secured network domain via the first connection;
  detect a termination of the first connection and subsequent to detecting the termination of the first connection:
  retrieve locally stored authentication information for a user and automatically switch from the first connection to a second connection to allow access to the secured network domain, wherein the first connection is a wired connection and the second connection is a wireless connection or the first connection is a wireless connection and the second connection is a direct connection and one or more of the first or second network connection is a virtual private network (VPN) connection;
  establish access to the secured network domain via the second connection by employing a second network configuration; and
  initiate one or more user login processes associated with the second network configuration using the retrieved locally stored authentication information.

10. The network device of claim 9, wherein one of the first network configuration or the second network configuration is associated with wired access to the secured network domain and one of the first network configuration or the second network configuration is associated with wireless access to the secured network domain.

11. The network device of claim 9, wherein the one or more processors are further configured to execute the stored programmed instructions to:
  detect the previously terminated first connection to again be available;
  automatically employ the first network configuration to establish access to the secured network domain via the available first connection; and
  terminate the second connection to the secured network domain after establishing access to the secured network domain using the first connection.

12. The network device of claim 9, wherein access to the secured network domain is substantially uninterrupted upon switching between the first and the second connections.

13. A network traffic management system, comprising one or more network traffic management devices, server devices, or client devices, the network traffic management system comprising memory comprising programmed instructions stored thereon and one or more processors configured to execute the stored programmed instructions to:
  monitor an existing first connection to a secured network domain, wherein a first network configuration is employed to access the secured network domain via the first connection;
  detect a termination of the first connection and subsequent to detecting the termination of the first connection:
  retrieve locally stored authentication information for a user and automatically switch from the first connection to a second connection to allow access to the secured network domain, wherein the first connection is a wired connection and the second connection is a wireless connection or the first connection is a wireless connection and the second connection is a direct connection and one or more of the first or second network connection is a virtual private network (VPN) connection;
  establish access to the secured network domain via the second connection by employing a second network configuration; and
  initiate one or more user login processes associated with the second network configuration using the retrieved locally stored authentication information.

14. The network traffic management system of claim 13, wherein one of the first network configuration or the second network configuration is associated with wired access to the secured network domain and one of the first network configuration or the second network configuration is associated with wireless access to the secured network domain.

15. The network traffic management system of claim 13, wherein the one or more processors are further configured to execute the stored programmed instructions to:
  detect the previously terminated first connection to again be available;
  automatically employ the first network configuration to establish access to the secured network domain via the available first connection; and
  terminate the second connection to the secured network domain after establishing access to the secured network domain using the first connection.

16. The network traffic management system of claim 13, wherein access to the secured network domain is substantially uninterrupted upon switching between the first and the second connections.

* * * * *